Figure 1:
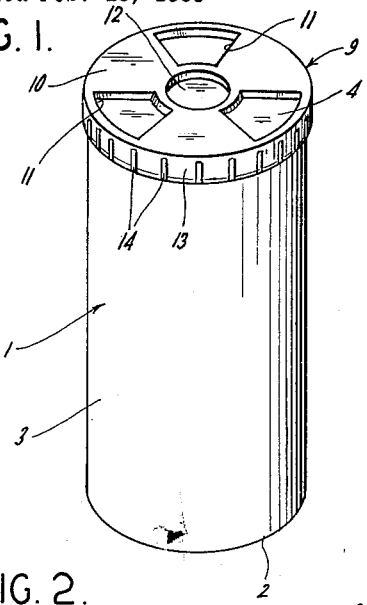

Oct. 16, 1962  W. ABT  3,058,630
DREDGER FOR DISPENSING POWDERED PRODUCTS
Filed Feb. 13, 1959  2 Sheets-Sheet 1

INVENTOR.
WALTER ABT

BY  Mocker Blum

ATTORNEYS

Oct. 16, 1962    W. ABT    3,058,630
DREDGER FOR DISPENSING POWDERED PRODUCTS
Filed Feb. 13, 1959    2 Sheets-Sheet 2
FIG. 8.
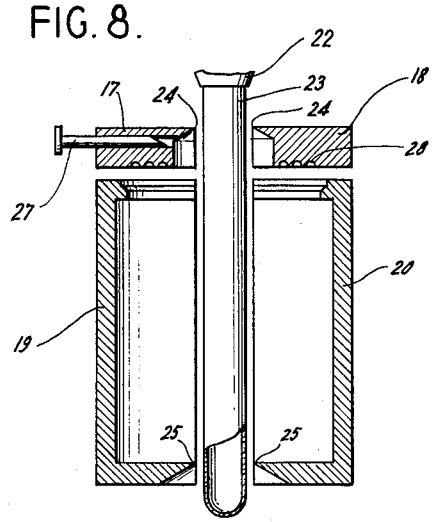
FIG. 9.
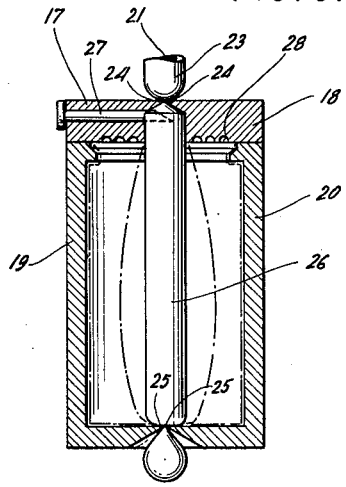
FIG. 10.
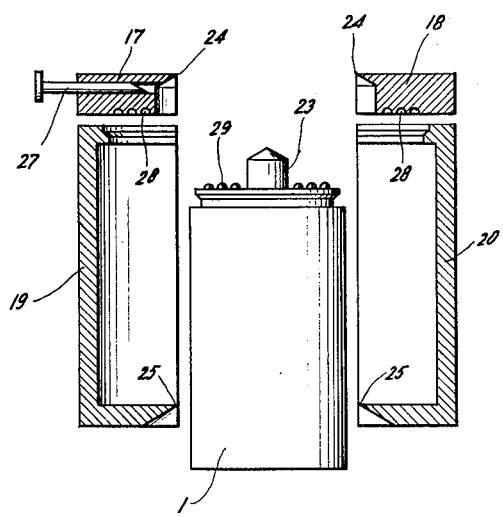
FIG. 12.
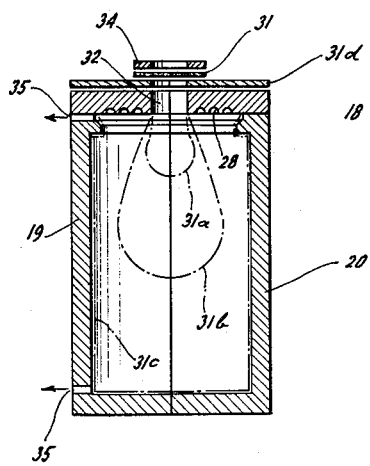
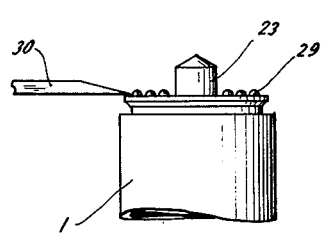
FIG. 11.
INVENTOR.
WALTER ABT
BY
Morket Beum
ATTORNEYS

United States Patent Office 3,058,630
Patented Oct. 16, 1962

3,058,630
DREDGER FOR DISPENSING POWDERED PRODUCTS
Walter Abt, Vevey, Switzerland, assignor to Afico S.A., La Tour de Peilz, Switzerland, a company of Switzerland
Filed Feb. 13, 1959, Ser. No. 793,178
3 Claims. (Cl. 222—484)

The object of the present invention is a dispenser or dredger device for dispensing powdered products, such as ground spices. This device may be a one-piece container whose wall is provided with perforations for dispensing the powdered material, and an opening for filling said container. The perforations can be closed by a rotary perforated cover. The invention also relates to methods for manufacturing the dispensing device.

Known dredgers or devices of this type generally consist of a hollow tumbler-shaped body which is provided with a detachable bottom or a detachable top. Hence, the complete old-type device is composed of at least two separable parts. If the bottom or top of the well-known device is detachable, a filling opening is superfluous. In these known devices, the dredging or dispensing perforations are located in either the separable bottom of the tumbler-shaped body or in the separable top of said body. The rotary cover of the old device is turnably connected to the center of either the bottom or the top by means of a pivot rivet or similar pivot fastening, or to the outer rim of the container. When these known devices have a special filling opening, it is located at the end which is opposite the dredging perforations.

In distinction, the new device which is the object of the present invention is characterized by the fact that the new container has a hollow one-piece body, said body being entirely closed except for the filling opening and the dispensing perforations. The top wall of this new one-piece container is a disc which has a filling opening and also has the dispensing perforations. The outer rim of this disc is integrally joined to the body of the container by a groove. This one-piece body is provided with a detachable and turnable cover which is located at the top wall of the one-piece container. At the middle of the inside face of the detachable and turnable cover, said cover has a projection which enters the container through the filling opening. The edge of said projection fits under the edge-wall of said filling opening. The cover has a flanged edge which turnably grips the rim of the said top disc. Also, the invention concerns a process for the manufacture of the device, according to which the one-piece container is shaped in a hollow mold, from a body or sheet of organic thermoplastic synthetic material which is rendered temporarily plastic and deformable by heat.

The one-piece container can be blown in a mold by inflating a bubble of said heated thermoplastic material on a mold, until the wall of the hot bubble contacts with the inner face of the mold. This mold consists of a plurality of separable sections, which can be separated after the shaped bubble has cooled and hardened. The bubble is thus shaped to provide it with a neck and with inflations or hollow ribs adjacent its neck. The height of these inflations is greater than the thickness of the wall of the shaped bubble. The neck and the inflations are sheared off the shaped bubble by external shearing means. The external shearing of the neck provides the filling opening. The external shearing of the hollow ribs provides the dispensing perforations of the one-piece container.

The invention is further explained in the following description and in the annexed drawings.

FIG. 1 is a perspective view of the assembled device, with its rotary cover in closed position.

Figure 3:
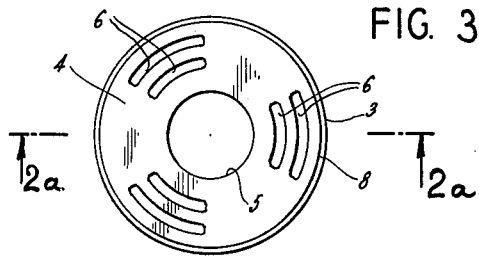
Figure 4:
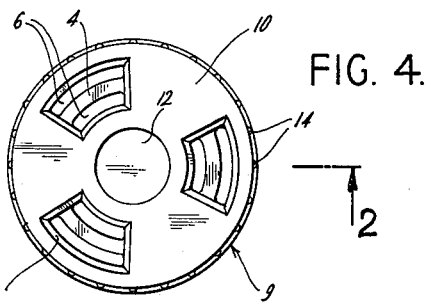
Figure 2:
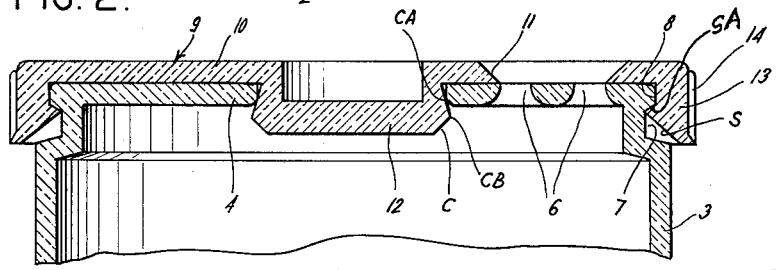
Figure 2A:
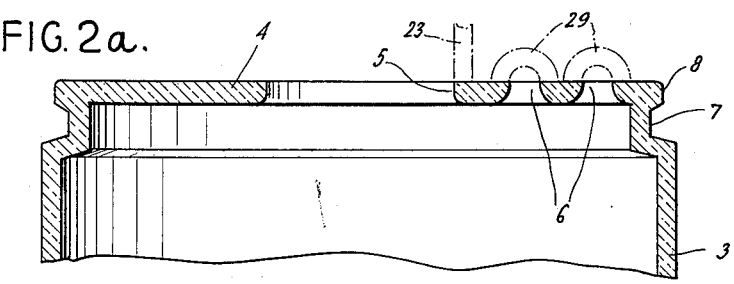
Figure 5:
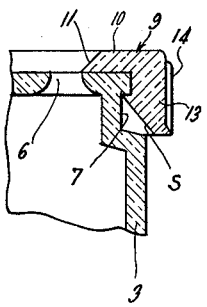
Figure 6:
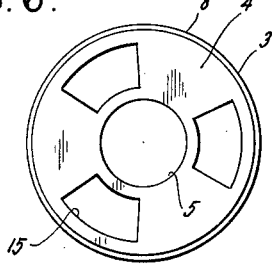
Figure 7:
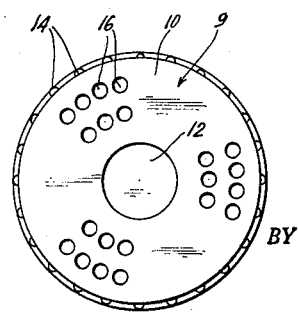

FIG. 2 is a section on the line 2—2 of FIG. 4.
FIG. 2a is a section on line 2a—2a of FIG. 3.
FIG. 3 is a top plan view of the body of the device with the rotary cover removed.
FIG. 4 is a top plan view of the device with its rotary cover in open position.
FIG. 5 shows a variation of FIG. 2.
FIG. 6 shows a variation of FIG. 3.
FIG. 7 shows a variation of FIG. 4.
FIGS. 8, 9 and 10 show three steps of the manufacture of the one-piece container according to the first manufacturing method.
FIG. 11 illustrates the shearing step.
FIG. 12 illustrates another method of making the one-piece container.

In these drawings, "1" designates a container which has a hollow one-piece body, which can be made of an organic thermoplastic plastic, such as polyvinyl chloride. This one-piece container 1 has a closed lateral bottom wall 2, a longitudinal cylindrical wall 3, and a disc-shaped top wall 4. Top wall 4 has a round filling opening 5 in its center. In FIG. 3, said top wall 4 has six dredging perforations in the form of elongated holes 6 which are arranged in two concentric circles relative to the vertical axis of the filling opening 5. These holes 6 are arranged in pairs in three sections. Directly below the top wall 4, the longitudinal wall 3 of the container has a recess or groove 7. The top wall 4 has a rim 8.

The container 1 is provided with a cover 9, which is rotatable around the longitudinal axis of cylindrical wall 3. This cover 9 is made of hard but elastic or resilient synthetic material, such as a suitable organic plastic. Said rotatable cover 9 has dispensing openings 11 in its top wall.

Said cover 9 has an inward, axial, plug-shaped projection 12, which has frusto-conical faces C and CA, which are integral at their bases, at the circular line CB, which is in a plane which is perpendicular to the longitudinal axis of the cylindrical wall 3.

The diameter of the circular line CB is slightly greater than the diameter of the filling opening 5 of the top wall 4. Due to its resilience, the plug-shaped projection 12 yields sufficiently under pressure, so that the plug-shaped projection 12 can be forced axially through filling opening 5, into the position shown in FIG. 2, in which a part of the upper frusto-conical face CA of plug-shaped projection 12 abuts the cylindrical edge-wall of filling opening 5. When projection 12 is thus fully inserted, the entire line CB is located below the filling opening 5, and the upwardly-tapered frusto-conical face CA resiliently exerts a downward latching force upon cover 9, thus maintaining the planar bottom wall of cover 9 pressed tightly against the planar top face of top wall 4.

The cover 9 has an outer flange 13 on which there is a series of small gripping projections 14. In FIG. 2, the inside wall of the flange 13 consists of two surfaces S and SA in the shape of truncated cones. The lower surface S widens towards the bottom. The upper frusto-conical surface SA widens towards the top. The diameter of the circular border at which these frusto-conical surfaces S and SA meet, is slightly less than the maximum diameter of rim 8 of the container. However, the resilient flange 13 expands temporarily when the cover 9 is placed under pressure on the container, so that the temporarily expanded flange 13 slips over rim 8 and fits under rim 8 in groove 7. Since the lower inside face S of flange 13 widens towards the bottom, the elastic expansion of flange 13 which results when the rotatable cover 9 is seated upon the body of the container, results in a seating force which also draws the edges of cover 9 downwardly towards the top 4 of the container 1.

Thus, cover 9 is drawn downwards towards the top 4 of the container both at the center of said cover 9 and its edge, the result being that the parts of cover 9 which are located between flange 13 and projection 12, especially the webs 10 of cover 9 which are between its windows 11, contact tightly with the top 4. When cover 9 is turned so that the webs 10 of cover 9 are situated over the openings 6 of top 4, said cover 9 hermetically closes container 1.

By turning cover 9 on its longitudinal axis, the windows 11 of cover 9 can be put into registration with openings 6, permitting the powdered product in the container 1 to be shaken out. As shown in FIG. 2, the openings 6 have substantially sharp edges at the upper surface of the top wall 4 of the container. These openings 6 widen downwardly. This results from the manufacturing process, which will be later explained.

The powder particles which enter openings 6 when the cover 9 of the container is in closed position, and which may stick under the webs 10 of cover 9, are scraped off by the sharp edges of these openings 6 and fall back into the container 1 when said container is opened by turning cover 9. For this reason, the particles cannot stick between top 4 and the cover 9. Such sticking would hinder and prevent the sealing action of the cover 9. Also, if such particles stick, they become soiled, and the soiled particles will drop into the food.

Rotary cover 9 is placed on the container 1 after said container has been filled through filling opening 5. Care must be taken that the projection 12 as well as the flange 13 fit, in the manner described, respectively in the filling opening 5 and in the groove 7. To fill the device, cover 9 of the container 1 is temporarily removed by pulling cover 9 in the direction of the vertical axis of the container, thus drawing the central projection 12 out of the filling opening 5 and pulling the flange 13 out of the groove 7 and out of engagement with rim 8.

In the variation shown in FIG. 5, the angle of the lower surface S of rim 8 is such that the apex of the cone which is formed by this surface is located outside of the body of the container and above the level of the rim 8. The wedging effect between flange 13 and rim 8, and therefore the tight contact of the cover 9 with the top 4, is thus improved.

In the variation shown in FIGS. 6 and 7, the top 4 of the container 1, instead of having six elongated dispensing openings, has three annular dispensing perforations 15; and the cover 9, instead of windows 11, has three groups of round holes 16.

In the manufacture of the body of the improved device in connection with the present invention, the following process is preferably used. A sheet of organic thermoplastic synthetic material in the form of a bubble, said bubble being rendered plastic and expansible by heating, is blown in a hollow mold by excess internal pressure until the outer wall of the hot and expanded bubble contacts closely with the inner wall of the mold. The plastic material of the bubble thus takes and retains the shape of the inner face of the mold by cooling and hardening the wall of the bubble in contact with said inner wall.

FIGS. 8–11 inclusive illustrate one manufacturing process. The mold includes two lower and identical halves 19 and 20, whose bottom walls have adjacent sharp and identical edges 25. The mold also includes two upper and identical halves 17 and 18, whose upper walls have identical straight sharp edges 24. FIG. 8 shows the separated positions of said mold parts 17, 18, 19, 20. The lower faces of the upper mold parts 17 and 18 have recesses 28, which correspond to the dispensing recesses 6 which are shown in FIG. 3 at the top 4 of the one-piece body.

While the mold-parts are in the separated positions shown in FIG. 8, a hollow tube 23 of hot and plastic organic thermoplastic material, such as polyvinyl chloride, is extruded from a conventional extrusion nozzle 22. This extrusion step is old and well known. When the tube 23 has been extruded to the desired length, which is shown in FIGS. 8 and 9, the upper mold halves 17 and 18 are first moved downwardly to contact with the lower mold halves 19 and 20, as illustrated in FIG. 9, and the parts of the mold are then moved horizontally towards each other to the relative position of FIG. 9.

When the lower mold halves 19 and 20 are thus moved horizontally towards each other, their straight and sharp and lateral edges 25 pinch and weld and cut the hot and plastic tube 23 close to the bottom end of said tube 23, as illustrated in FIG. 9.

When said upper mold halves 17 and 18 are then moved horizontally towards each other in unison with the lower mold halves 19 and 20 while upper mold halves 17 and 18 contact with lower mold halves 19 and 20, the straight and sharp and lateral edges 24 of said upper mold halves 17 and 18 pinch and weld and cut the hot and plastic extruded tube 23 close to its top end 21.

As illustrated in FIG. 9, a hot and plastic and expansible cylindrical bubble 26 is thus severed from the extruded cylindrical tube 23. Said cylindrical bubble 26 is closed at its top and bottom welded ends, at edges 24 and 25.

A hollow needle 27 is now actuated in a horizontal bore of the lower mold-part 19, in order to perforate the wall of the hot and plastic and expansible bubble 26.

Compressed air is introduced through needle 27 into the bubble 26 which is still hot and plastic and expansible, thus causing excess internal pressure within said bubble 26. This excess internal air pressure causes the bubble 26 to expand, while the air in the closed mold between the bubble 26 and the internal wall of the closed mold escapes through the joints of the closed mold. The bubble 26 is thus inflated until its wall contacts completely with the inner wall of the closed mold which is shown in FIG. 9, and the hot and plastic wall of the bubble 26 cools and hardens in contact with the relatively cold inner surface of the closed mold. This forms a one-piece container, which is finished by the shearing action shown in FIG. 11. When the bubble 26 has cooled and hardened, the mold is opened and the container 1 is removed. The same operation is carried out to make more containers.

The recesses or depressions 28 are entered by respective hollow ribs or inflations 29 of the top part of the inflated bubble 26. These top inflations 29 of the inflated bubble 26 are indicated in broken lines in FIG. 2a. The height of each top hollow rib or inflation 29 is at least equal to the thickness of the wall of the inflated bubble, and said height may be greater than said thickness.

Each cooled body 1 which has been thus shaped from the plastic tube 23 is then freed from the connected part of said tube 23 and from the ribs 29, in a single operation, by means of a shearing instrument 30 (FIG. 11), which shears off all excess material projecting beyond the flat surface of the top 4. This shearing instrument 30 shears off the end of tube 23 which remains attached to the edge of the filling opening 5, and also shears off the inflations or hollow ribs 29 of top 4 to form the dredging or dispensing perforations 6.

In the alternative manufacturing process which is illustrated in FIG. 12, the lower-mold part 19 has outlet channels 35 for permitting the escape of air from the closed mold. In this embodiment of FIG. 12, the bottom walls of lower mold-halves 19 and 20 have straight and blunt adjacent lateral edges, and the upper mold-halves 17 and 18 have adjacent blunt and identical semi-cylindrical edges, which define a central cylindrical bore 32 when the mold is in the closed position of FIG. 12.

The lower faces of the upper mold-halves 17 and 18 have the previously mentioned recesses 28. The starting material in the process of FIG. 12 is a flat, imperforate disc 31, which is made of an organic thermoplastic, such as polyvinyl chloride. The apparatus of FIG. 12 includes a top clamping member 31d which has a central, axial, cylindrical bore, which registers with the bore 32. The original flat, imperforate, thermoplastic disc 31 is suitably heated, as by means of infra-red rays, until the entire disc 31 is softened to be extensible and moldable. The annular head 34 has a central cylindrical perforation, which registers with bore 32. The annular head 34 is used to clamp the annular peripheral portion of the soft and hot disc 31, against the member 31d, which is held fixed relative to the assembled upper mold parts 17 and 18.

While the annular peripheral portion of the hot and soft disc 31 is thus held fixed relative to the upper mold parts 17 and 18, and while said upper mold parts 17 and 18 are held fixed relative to the lower closed mold parts 19 and 20 in the positions of FIG. 12, a vacuum is created in the space between the closed mold halves 19 and 20, by means of channels 35.

The vacuum will draw the central, unclamped, imperforate part of the hot disc 31 into the aligned central bores of the assembled top member 31d, and of the assembled upper mold members 17 and 18, to form successive expanding bubbles illustrated by 31a and 31b in FIG. 12, until the expanded bubble has the final shape 31c, in which said bubble fits against the inner cylindrical face of the assembled mold halves 19 and 20, and the inflations or hollow ribs 29 are also formed. The mold parts are separated after the bubble 31 has cooled and hardened. The shaped container which is thus made has substantially the shape shown in FIG. 10.

The above-mentioned external shearing operation is then used to finish the top of the one-piece container which is thus formed, in order to provide the central filling opening 5 and the dispensing openings 6 or 16. The top member 31d may be sectional and consist of separable parts, like the sectional and separable members 17 and 18.

Instead of using a vacuum on the inside of the mold 19—20 in the process of FIG. 12, an excess pressure can be exerted on the outside of disc or membrane 31, in which case the air can escape from the interior of the mold through the channels 35 to the outside of the mold, or as shown in the embodiment of FIGS. 7 to 10, through the joints of the assembled mold parts.

If the container 1 of the improved device is manufactured according to either of these processes, its opening 5 has a triple function. Said opening 5 serves as a filling opening for the powdered product. The wall of opening 5 grips the projection 12 which serves as a pivot for the rotatable cover; and during the manufacture of the container, said opening 5 serves to introduce air by means of which the bubble of organic synthetic thermoplastic plastic or resin, which is shaped from either tube 23 or disc 31, is given the form of the container 1.

In the manufacturing processes described, the filling opening 5, like the dispensing perforations 6 or 16, is obtained without using a punching tool, so that it is never necessary to work with a tool on the inside of the top 4. In this way it is possible to manufacture the top 4, the cylindrical part 3, and the bottom 2 of the container in one piece, thus making large-scale and economical manufacture possible.

Top 4 and cover 9 are not necessarily flat. Top 4 may be in the form of a part of a sphere or a part of an ellipsoid.

I have thus provided a finished dredging device which includes a one-piece, hollow container, which has a filling opening and at least a single dispensing opening in the one-piece molded wall of said hollow container. Said one-piece wall is originally molded with original, hollow and outwardly extending respective projections at the marginal wall of said filling opening and at the marginal wall of each said dispensing opening.

In the finished dredging device, the marginal wall of the filling opening and the marginal wall of each dispensing opening is at the sheared base of the respective hollow and outwardly extending original projection. The invention includes this one-piece, hollow container, irrespective of other combinations disclosed herein.

I claim:

1. A dredger for dispensing powdered products, comprising a hollow one-piece container which has dredging perforations and a filling opening, and a rotary cover which has supplemental perforations, said cover being rotatable relative to said container to a dispensing position in which said supplemental perforations register with said dredging perforations; said cover being also rotatable relative to said container to a non-dispensing position in which said supplemental perforations are out of registration with said dredging perforations; said container being of a thermoplastic material and wholly closed except for said dredging perforations and said filling opening, said container having a top in which said filling opening and said dredging perforations are located, said filling opening being centrally located in said top, said top having a peripheral rim; said rotary cover having a central inward projection which fills and extends inwardly through said filling opening, said projection rotatably and detachably engaging the wall of said filling opening, said rotatable cover having a peripheral flange which extends over and detachably and rotatably engages said peripheral rim, said top having a planar uppermost surface and said cover having a lower planar surface in wiping surface-to-surface engagement with said top uppermost surface, said dredging and supplemental perforations having registering sharp edges at said planar surfaces whereby to inhibit the sticking of the powdered product between said planar surfaces of said top and cover.

2. A dredger for dispensing powdered products, comprising a hollow one-piece container which has dredging perforations and a filling opening, and a rotary cover which has supplemental perforations, said cover being rotatable relative to said container to a dispensing position in which said supplemental perforations register with said dredging perforations; said cover being also rotatable relative to said container to a non-dispensing position in which said supplemental perforations are out of registration with said dredging perforations; said container being of a thermoplastic material and wholly closed except for said dredging perforations and said filling opening, said container having a top in which said filling opening and said dredging perforations are located, said filling opening being centrally located in said top, said top having a peripheral rim; said rotary cover having a central inward projection which fills and extends inwardly through said filling opening, said projection rotatably and detachably engaging the wall of said filling opening, said rotatable cover having a peripheral flange which extends over and detachably and rotatably engages said peripheral rim, said top having a planar uppermost surface and said cover having a lower planar surface in wiping surface-to-surface engagement with said top uppermost surface, said dredging and supplemental perforations having registering sharp edges at said planar surfaces whereby to inhibit the sticking of the powdered product between said planar surfaces of said top and cover, said dredging perforations enlarging inwardly of the container and said supplemental perforations enlarging outwardly thereof, and said filling opening and said dredging perforations having marginal walls disposed in a common plane with said uppermost top surface.

3. A dredger for dispensing powdered products, comprising a hollow one-piece container which has dredging perforations and a filling opening, and a rotary cover which has supplemental perforations, said cover being rotatable relative to said container to a dispensing position in which said supplemental perforations register with said dredging perforations; said cover being also rotatable relative to said container to a non-dispensing position in which said supplemental perforations are out of registration with said dredging perforations; said container being integrally formed of a blown thermoplastic material and wholly closed except for said dredging perforations and said filling opening, said container having a top in which said filling opening and said dredging perforations are located, said filling opening being centrally located in said top, said top having a peripheral rim; said rotary cover having a central inward projection which fills and extends inwardly through said filling opening, said projection rotatably and detachably engaging the wall of said filling opening, said rotatable cover having a peripheral flange which extends over and detachably and rotatably engages said peripheral rim, said top having an uppermost surface and said cover having a lower surface in wiping surface-to-surface engagement with said top uppermost surface, said dredging perforations enlarging inwardly of the container and having sharp edges at said top uppermost surface whereby to inhibit the sticking of the powdered product between said surfaces of said top and cover.

References Cited in the file of this patent
UNITED STATES PATENTS

| | | |
|---|---|---|
| 1,486,641 | Dasher | Mar. 11, 1924 |
| 2,206,209 | Thorn | July 2, 1940 |
| 2,262,612 | Kopitke | Nov. 11, 1941 |
| 2,327,391 | Baker | Aug. 24, 1943 |
| 2,690,861 | Tupper | Oct. 5, 1954 |
| 2,764,453 | Robb et al. | Sept. 25, 1956 |
| 2,817,451 | Giles et al. | Dec. 24, 1957 |
| 2,931,541 | Southwell | Apr. 5, 1960 |

UNITED STATES PATENT OFFICE
CERTIFICATE OF CORRECTION

Patent No. 3,058,630                              October 16, 1962

Walter Abt

It is hereby certified that error appears in the above numbered patent requiring correction and that the said Letters Patent should read as corrected below.

In the grant, line 2, and in the heading to the printed specification, line 5, for "La Tour de Peilz, Switzerland", each occurrence, read -- Lausanne, Switzerland --.

Signed and sealed this 30th day of April 1963.

(SEAL)
Attest:

ERNEST W. SWIDER
Attesting Officer

DAVID L. LADD
Commissioner of Patents